INVENTOR.
H.R. LEGATSKI
ATTORNEYS

Sept. 28, 1954  H. R. LEGATSKI  2,690,060
FRACTIONAL DISTILLATION
Filed Aug. 22, 1949  4 Sheets-Sheet 4

FIG. II.

INVENTOR.
H.R. LEGATSKI

ATTORNEYS

Patented Sept. 28, 1954

2,690,060

UNITED STATES PATENT OFFICE 2,690,060

FRACTIONAL DISTILLATION

Harold R. Legatski, Bartlesville, Okla., assignor to Phillips Petroleum Company, a corporation of Delaware Application August 22, 1949, Serial No. 111,684

16 Claims. (Cl. 62—122)

This invention relates to an improved method and apparatus for fractionally distilling multi-component mixtures. In one of its more specific aspects it relates to a method and apparatus for the separation of a component from a multi-component mixture at subatmospheric temperatures. In a still more specific aspect this invention relates to a method and apparatus for the separation of nitrogen from admixture with methane and other light hydrocarbon gases or from natural gas.

In prior art distillation processes, an apparatus termed a distillation, fractionation or rectification column has been widely used. Such distillation apparatus, as the fractionating column, is used in the petroleum and in many other industries. Fractionating columns equipped with trays and bubble caps, while only reasonably efficient, have proven very useful in the separation of such hydrocarbons. In the operation of such columns when it is desired to produce an overhead distillation product of a desired composition, it has been found expedient to condense at least a portion of the vaporous overhead product and return this condensed portion to the top of the fractionator. When distilling a complex mixture containing many components the return of condensed overhead material will control the "end boiling point" of the overhead material while if one component is being separated from a multi-component mixture, the overhead condensed material will consist mainly of this one component and by return of some overhead condensate to the top of the tower only substantially pure component will be removed from the top.

When liquid condensate, called reflux, is returned to the top of a fractionating tower it is partially vaporized by and extracts heat from the upwardly flowing vapor in the tower and in so doing causes partial condensation of these vapors. Partial condensation in the top of a fractionator may also be produced by indirect heat exchange in a closed coil with a reflux-producing fluid under which conditions none of the cooling fluid is added to the contents of the fractionator. In order to cause the distillation to occur, heat, of course, has to be added to the contents of the vessel at some point below the point of addition of reflux. It is common practice to add a portion of this heat with the feed stock being fractionated and the remainder to the liquid material in the bottom of the fractionator. The heat added to the bottom of the fractionator is generally termed reboil heat and this particular heat causes the liquid contents in the bottom of the vessel to boil and this boiling, of course, causes the formation of vapors and these vapors may pass upward from section to section or, specifically speaking, from tray to tray in the fractionator. Thus, in common fractionation, heat is added to the bottom of the vessel and heat is removed from the top of the vessel. A marked difference of temperature exists between the reboiler and the reflux addition points, the former, of course, being maintained at the higher temperature.

When it is desired to separate normally gaseous hydrocarbons from a mixture of hydrocarbons, lower temperatures and/or higher pressures are required to maintain at least a portion of the material to be distilled in the liquid state. Distillation costs for the separation of butane, for example, from admixture with pentane are not especially high but when a separation between methane and ethane is desired the cost considerations are entirely different. It is well known in gas separation art that commercial processes using low temperatures are very costly. The lower the temperature, the more costly is the operation. Thus, when methane is to be separated from ethane, operating costs are high.

With the widening use of gaseous fuel, especially natural gas, for domestic and commercial heating purposes, natural gas has become much more valuable than previously. Some natural gases are relatively pure from the point of view of hydrocarbon content while others contain such impurities as moisture, carbon dioxide, sulfur compounds, nitrogen and even such rare gases as helium. Ordinarily, the helium content of the few known helium containing gases is not so high as to cause appreciable degradation in heating value of the gas. However, some gases are known which contain large proportions of carbon dioxide and/or nitrogen. The separation of carbon dioxide from a natural gas is not an especially difficult problem and numerous methods are known for effectively making the separation. The presence of nitrogen in a natural gas, however, presents an entirely different problem. Nitrogen is relatively inert to chemical reagents and possesses a very low boiling point. Consequently its separation from natural gas is a very difficult and expensive problem.

I have devised a process by which nitrogen is effectively separated from a natural gas-nitrogen or a methane-nitrogen mixture by distillation in which the operating costs are much lower than when conventional distillation methods are used.

One object of my invention is to provide a process for low temperature fractionation which requires less refrigeration than required by conventional processes.

Another object of my invention is to devise a process in which power requirements in the form of compression horsepower are less than in conventional processes.

Still another object of my invention is to devise a process and an apparatus in which to carry out this process in which a smaller temperature difference is maintained between the bottom and the top of a fractionator vessel than in conventional distillation.

Yet another object of my invention is to provide a process for low temperature fractionators in which the amount of heat flow in the fractionation column is reduced to a minimum and an apparatus in which to carry out the process.

Yet another object of my invention is to provide a process for low temperature fractionation having improved thermodynamic efficiency.

Still other objects and advantages of my invention will be apparent to those skilled in the art upon reading this specification and drawing which respectively describe and illustrate a preferred mode of operation of my process and preferred apparatus in which to carry out my process.

My improved method of fractional distillation amounts to the discovery that fractionating columns can be more efficiently and economically operated with a variable reflux ratio.

This discovery represents a decided departure from the conventional design and operational practices wherein it is always assumed that a condition of constant molal overflow exists from tray to tray in a fractionator. To illustrate the utility of my invention I have applied this discovery together with my improved apparatus to the separation of nitrogen from methane or to the separation of nitrogen from a natural gas containing of course some nitrogen but largely methane with some ethane and a still smaller amount of propane. One advantage of my process over conventional fractionation for the separation of nitrogen from such a mixture is the decreased reflux requirement. Based on a plant for processing 360 million cubic feet per day of dry natural gas to produce a propane and heavier raw natural gasoline and a nitrogen-free residue gas, only 6.5 mols of reflux are needed in contrast to 35 mols of the same reflux to the top of a conventional fractionating column operating to make the same product from the same charge stock. Since the top of a fractionating column is the lowest temperature point of column, it is then obvious that less low temperature refrigeration is needed when operating according to my process than when operating by conventional fractionation.

I am able to carry out effectively such a separation by distillation since I use a variable reflux ratio. The amount of reflux is increased at successively lower points from the top to the feed point of the vessel. To minimize the contacting of liquid and vapors of widely different temperature, I maintain an upward flowing stream of vapors in direct and continuous contact with a downward flowing stream of liquid. The liquid flowing downward through my fractionator is maintained as a thin film of liquid flowing over the surface of thin sheets of heat conductive metal. There are provided in my vessel many of these thin sheets of metal. These metal sheets are maintained relatively close together so that small spaces only are provided through which the rising vapors may pass. These metal sheets form in effect secondary heat exchangers with extended surface, and these exchangers are in heat exchange contact with primary exchangers and within the primary exchangers a heat exchange medium is passed. The primary heat exchangers may be vertically or horizontally disposed metal tubes contained within the shell or walls of the fractionator vessel. Feed stock which may be vapor, liquid, or part vapor and part liquid is introduced into the vessel at about a midpoint vertically. Since temperatures above the feed point are, in general, maintained lower than the temperature at the feed point, said vapors rising upward may be condensed in part and such condensate will flow downward as thin films on the heat exchange tubes and extended secondary surfaces. The vapors or gases, accordingly, flow upward in intimate contact with the down flowing films of liquid.

Temperatures within the tubes below the feed point of the vessel are, in general, maintained higher than the feed temperature so that vaporization of the more volatile constituents of the feed will occur. The material vaporized in the reboiler section passes upward to the first incremental section where it is at least partially condensed thereby causing the formation of a new vapor phase of altered composition in comparison with that entering the section. This partial condensation and vaporization occurs in each incremental section of my fractionation apparatus. Provision, of course, is made for removal of vapors from the top of the vessel and for removal of residual liquid from the bottom.

It is believed that by operating my process in such a manner that the liquid film flowing down the heat exchange surfaces is slowly but gradually increased in temperature so that the temperature differential from one point to another represents only a very small change of temperature, that is, the temperature will be increased only a very slight extent from one point to a point just below the first point. Since the contact between the upward flowing vapors and the downward flowing films of liquid is very intimate, the upward flowing vapors are then cooled in a very gradual manner from one point in the tower to a higher point. It is further intended that a minimum temperature difference exist between vapors passing upward and liquid passing downward at the same cross sectional point in the tower. In other words, it is intended that when vapor contacts liquid, there is but a minimum of temperature difference between that vapor and that liquid at the time of contact, that is, there is a minimum entropy increase. This type of operation is entirely different than in conventional fractionation in which vapors at one temperature from a lower tray pass through bubble caps of a tray above and contact liquid on this latter tray at a lower temperature in which contacting there is a large entropy increase. For example, liquid reaching tray No. 10 from tray No. 9 (above) may be at a temperature of 5 to 25° lower than the vapors reaching tray No. 10 from tray No. 11 (below). When liquids and vapors at such different temperatures contact each other, there is a large loss of energy on contact and in terms of thermodynamics, this energy loss represents an increase in entropy. If operation according to my process were carried out in such a manner that gas and liquid at the same temperature were contacted with each other, that is, the temperature change is zero upon contact of the gas with the liquid, then the entropy change is zero and the efficiency of the operation is a maximum.

To operate a separation process in which the entropy change was zero, it would be necessary that the liquid flowing downward from a given cross section of the column or separation zone be in equilibrium with vapor flowing upward into this same section. This is the opposite of the condition which exists in the usual fractionation column and actually this ideal condition cannot be attained. However, it is possible to approach this ideal much more closely by the process of this invention than has been done previously in the art. In conventional fractionation, a stream (really a plurality of streams passing upward through vapor risers) of vapor at a relatively higher temperature is brought into contact with a body of liquid at a relatively lower temperature by means of a bubble cap. Obviously the fugacity of a given component in such a vapor stream is very different than the fugacity of the same component in the liquid. These two conditions favor a maximum entropy change and thus energy loss in the separation process. When the vapor and liquid streams are the sole heat exchange fluids within the separation zone, the maximum entropy change and thus the lowest thermodynamic efficiency exists. In the thermodynamic sense, energy is lost or wasted whenever heat must be transferred between two different temperature levels and since in a conventional fractionator heat is being transferred from the reboiler temperature level to the condenser temperature level an excessive energy loss or entropy increase occurs. The patent art on separation processes discloses many instances in which a heat exchange element is placed on one or more trays of a column and in Patent 2,292,350 such an element is shown on each tray of the column. These modifications have numerous advantages in a variety of separation processes such as the separation of heat polymerizable or decomposable materials wherein the addition of all of the heat at the reboiler causes excessive polymerization and loss of material.

The process of this invention provides a method for separating nitrogen from natural gas and in one specific embodiment it shows a method for separating nitrogen from methane. This method involves the separation of components having substantially different latent heats of vaporization. In the process, it is desirable to supply only enough energy to obtain separation and if this ideal could be attained the entropy change would be zero, however, in actual practice, the energy supplied must be slightly in excess of this minimum in order to have a potential or driving force. The minimum energy required is indirectly the minimum reflux required for the separation.

In the process of my invention, the liquid flowing downwardly through the column is distributed as a thin film over a substantially continuous heat transfer surface. The vapor is passed countercurrently to this downwardly flowing liquid film. The amount of energy supplied to these two streams by means of a heat exchange fluid is just slightly in excess of that required for separation, or in other words an amount in excess so as to create a driving force. It should now be apparent that the vapor flowing through an incremental height of the separation zone is at a temperature very close to the temperature of the liquid flowing through the same increment. Likewise, the fugacity of a given component in the vapor approaches the fugacity of the same component in the liquid. Furthermore, the mixing of vapor and liquid streams at substantially different temperature levels is eliminated. The net result is that the vapor and liquid streams passing through the separation zone are not the principal heat exchange fluids and thus the entropy change for the separation of the components is at a minimum.

Figures 1, 2:
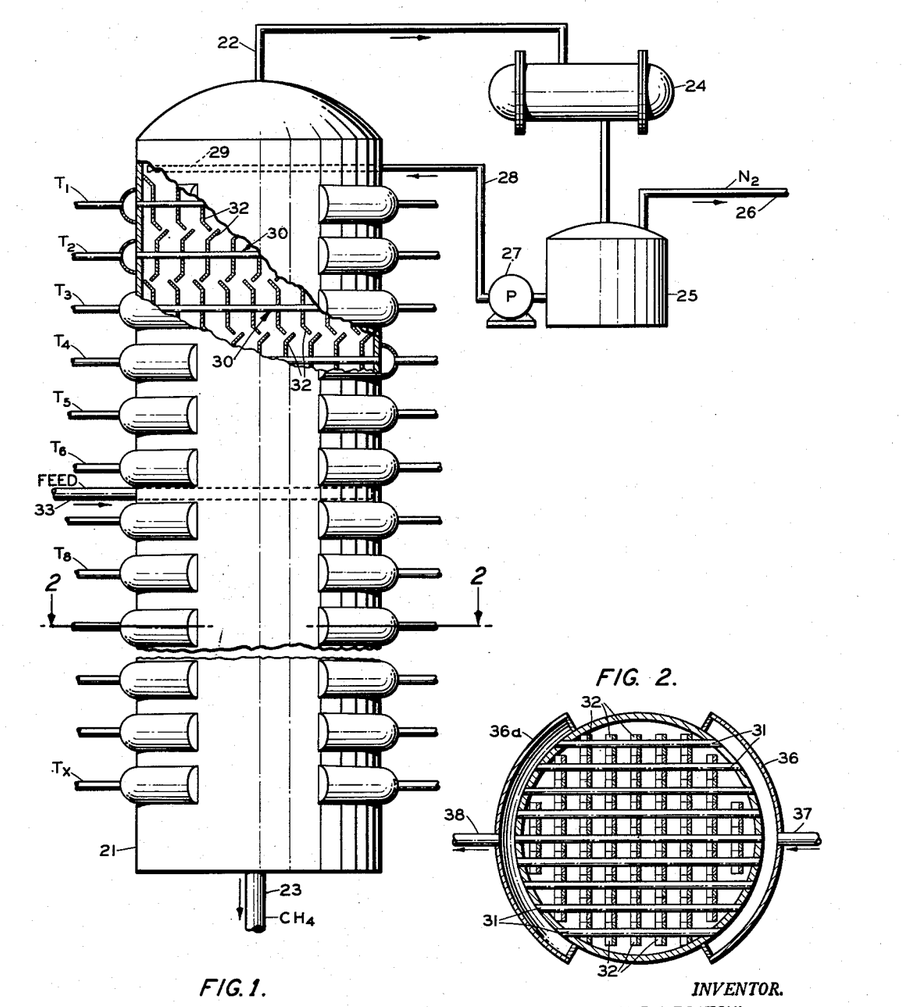
Figure 1 is an elevational view, partly in section showing one embodiment of apparatus in which to carry out the process of my invention.
Figure 2 is a cross sectional view of the apparatus taken on the line 2—2 of Figure 1.

Referring now to the drawing and specifically to Figure 1, a distillation vessel 21 may be cylindrical in shape and contain an overhead vapor withdrawal line 22 and a bottoms product line 23. A condenser 24 in the overhead line 22 is intended to furnish cooling for condensation of at least a portion of the overhead vapor. The condensate so produced flows into an accumulator vessel 25. A line 26 is supplied for removal of the gaseous nitrogen as an overhead product from the accumulator. A pump 27 in line 28 is for transfer of liquid condensate from the accumulator vessel 25 as reflux into the top of the distillation vessel 21. A distributor 29 in the top of the vessel 21 may contain a plurality of perforations or small openings designed for equal distribution of liquid reflux over the cross sectional area of the vessel. Disposed horizontally and at closely spaced intervals vertically are a plurality of heat exchangers 30. These heat exchangers may be composed of the number of horizontally disposed tubes 31 which may be clearly seen in Figure 2. Disposed upon the tubes 31 may be a plurality of heat exchange elements 32 which may be merely flanges or fins or other heat conducting elements which substantially extend the heat transfer surface. These fins or flanges may, if desired, be of such shape as illustrated in Figure 1 and when properly installed on the heat exchange pipes 31, a plurality of irregular, tortuous paths for the upward flow of vapors are formed. These fins 32 are intended to present a very large heat exchange surface so that liquid reflux introduced through the perforated distributor 29 may flow downward in the column as very thin films of liquid over these fins. And further, since the temperature of these heat exchange elements in the tower at points above the feed inlet 33 is lower than at the feed inlet point, the reflux flowing downwardly over these fins is continuously enriched with respect to the higher boiling constituents in the feed, while the upwardly flowing vapor is continuously enriched with the lower boiling constituents. This continuous interchange occurs on the very large or extended surface area of the fins. External refrigerant from a source, not shown, may pass into the uppermost of the heat exchangers 30, the temperature of which is maintained at substantially the temperature of the reflux liquid entering through distributor 29 or preferably, this upper exchanger is maintained at a temperature slightly higher than the temperature of the liquid reflux entering through distributor 29. $T_1$ refers to upper exchanger, $T_2$ the next lower, etc. while $T_x$ refers to the exchanger nearest the bottom of the vessel 21. The exchanger $T_2$ is maintained at a higher temperature than is exchanger $T_1$ by control of the temperature of refrigerant flowing into the exchanger $T_2$ through line 37. Exchanger $T_3$ is maintained at a higher temperature than is exchanger $T_2$. Likewise, all heat exchangers $T_4$, $T_5$, etc., on down the tower are maintained at successively higher temperatures. This temperature gradient is controlled in such a manner, as mentioned hereinbefore, that the temperature at the feed inlet point is the same as the temperature of the feed entering the column. Exchangers farther down the column as, for example, exchanger $T_x$ are maintained at still higher temperatures in such a manner that any nitrogen in solution in the liquid methane will be distilled from the solution to pass upward through the tower through the tortuous path between the fins 32. By the time liquid reaches the bottom or what is normally termed the reboiler section of the tower 21, the temperature will be at the highest of any point of the tower.

In order to maintain approximately constant temperatures throughout any given cross section of the vessel, header or segmental bustle ring 36 and 36a are provided at either end of the exchanger tubes 31 so that refrigerant from a source, not shown, may flow through a pipe 37 into the header 36, then flow through the plurality of tubes 31 to be collected again in the other header 36a and from thence the refrigerant may flow through the pipe 38 to a lower exchanger or to some other apparatus part of the plant. By controlling the refrigerant passing through the exchangers 30 in such a manner that the overhead product leaves the vessel through line 22 at the temperature of −249° F. (see example given hereinbelow) and bottoms leave through line 23 at a temperature of −174° F., the overhead product contains 92.17 percent nitrogen while the kettle product contains only 1.36 percent nitrogen. Only six and five tenths mols of liquid nitrogen at −307° F. were required as the external reflux to the top of the column.

A larger number of mols of liquid nitrogen than of liquid methane are required for refluxing a column operating to separate nitrogen from methane due to the difference in the latent heats of vaporization of nitrogen and of methane. The following table illustrates this point.

*Latent heat B. t. u. per mol*

| Temperature | Nitrogen | Methane |
| --- | --- | --- |
| −300° F | 2,173 | 3,823 |
| −200° F | 1,749 | 2,630 |

From this table it is seen that there is required about 1½ mols of nitrogen to reflux or condense one mol of methane. Thus, an excessive quantity of nitrogen must be returned to the top of a conventional tower in order to condense the methane-rich reflux at a lower point in the column.

Figure 11:
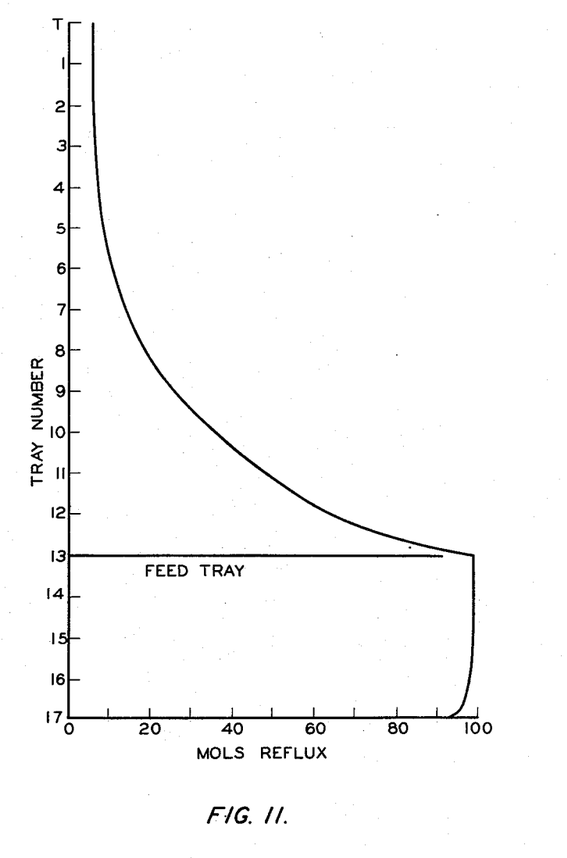
Figure 11 is a curve showing the mols of reflux per tray in an apparatus similar to that represented in Figure 1.

The curve shown as Figure 11 shows the variation in reflux requirement from the top of the column to the feed tray in the column which utilizes my improved method. It should be apparent that it is much more efficient and economical to condense the minimum quantity of reflux as required on each tray equivalent rather than utilizing the principle of constant mol overflow. My method makes it possible to condense the increased quantities of reflux at successively higher temperatures rather than at the lowest temperature level as done in conventional fractionation in which the same number of mols of liquid reflux is added to the top of the tower as there are flowing from tray to tray at any point in the tower.

In one process of the prior art, a distillation vessel is used in which a plurality of heat exchange elements is shown through the vertical height of the tower. Each of these heat exchange elements, however, is so constructed with respect to a tray that the heat is exchanged between a heat exchange material in the element and a quantity of liquid which surrounds the heat exchange elements as a lake. This prior art process may be operated to add heat to the fractionator, to cool or remove heat from the column or from any tray, as desired, but such heat removal or heat addition is made to a quantity of liquid on that tray and the vapor entering this tray from the tray below will be at a substantially higher temperature level which means that heat must be exchanged between the vapor and liquid and thus the upwardly flowing vapor and downwardly flowing liquid become heat exchange fluids within the column in contrast to my process in which a quantity of heat is transferred to a thin film of liquid and vapor in such a manner that the thin film of liquid and the vapor are maintained at substantially the temperature of the heat exchange element at that point which is substantially the equilibrium temperature and thus the liquid and vapor streams in my process are not the heat exchange fluids within the column.

Figure 3:
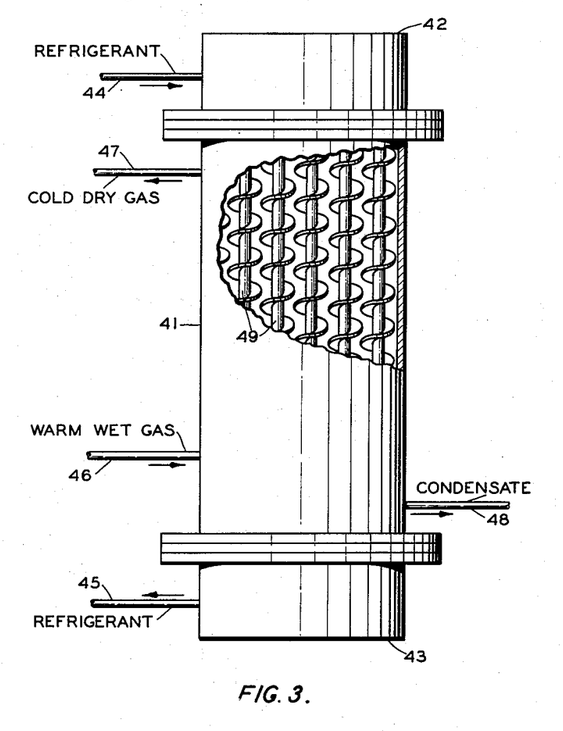
Figure 3 is an elevational view, partly in section, of another embodiment of apparatus in which to carry out the process of my invention.
Figure 4:
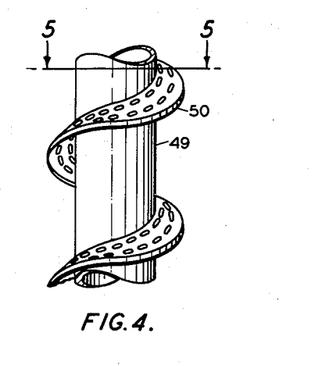
Figure 4 is an elevational view of an apparatus part of Figure 3.
Figure 5:
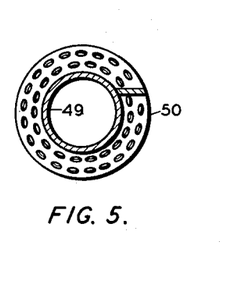
Figure 5 is a cross sectional view of the apparatus of Figure 4.
Figure 6:
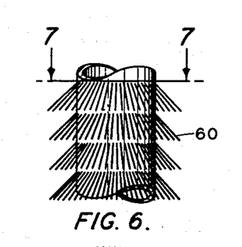
Figure 6 is an elevational view of another embodiment of the apparatus part shown in Figure 4.
Figure 7:
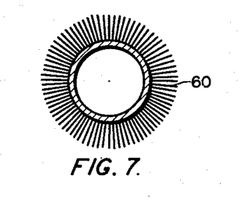
Figure 7 is a cross sectional view of the apparatus of Figure 6.
Figure 8:
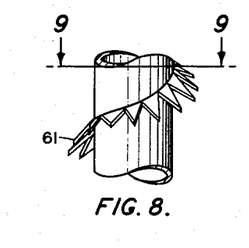
Figure 8 is still another embodiment of the apparatus part of Figure 4.
Figure 9:
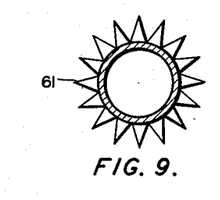
Figure 9 is a cross sectional view of the apparatus part of Figure 8.

The process of my invention may be practiced by utilizing a different embodiment of apparatus, such as that illustrated in Figure 3. This apparatus consists of a shell 41, a refrigerant inlet cap 42 and a refrigerant outlet cap 43. A pipe connection 44 is provided in inlet cap 42 for passage of refrigerant from a source, not shown, into the inlet cap, and a pipe connection 45 is provided in the outlet cap 43 so that refrigerant may flow from the cap 43 to any disposal that is desired. The exchanger shell 41 is provided with three pipe connections 46, 47 and 48. Pipe connection 46 is positioned some little distance above the bottom of the shell when the axis of the shell is disposed vertically. The pipe connection 47 is placed at a point near the top of the shell 41 while connection 48 is disposed at a point near its bottom. Within the shell 41 is disposed a plurality of vertically arranged heat exchange tubes 49. These heat exchange tubes are installed in the shell 41 in a manner more or less similar to the construction of a conventional heat exchanger. The refrigerant inlet cap 42 and a refrigerant outlet cap 43 are intended to be headers so that refrigerant may pass from header 42 through the plurality of tubes 49 in the shell 41 into the header 43. In order to provide an effective heat exchange surface for the tubes 49, ribbons or strips of metal may be wound around and bonded to these tubes in the form of helixes. Such helixes are illustrated in Figure 3. Figure 4 illustrates an enlarged section of such a helical heat exchange ribbon surrounding a heat exchange tube 49. This heat exchange ribbon may contain perforations 50, if desired, for the purpose of permitting vapors rising upward in the shell to contact more efficiently the down flowing films of liquid. Figure 5 is an end view of the heat exchange tube of Figure 4 with its spiral ribbon of heat conducting metal. Figure 6 illustrates a second embodiment of heat exchange tube which may be equipped with spines or fingers 60 in place of the spiral ribbon of Figure 4. Figure 7 is an end view of the spine or finger containing heat exchange tube of Figure 6. Figure 8 is still another embodiment of a heat exchange tube which is provided with a spiral or helix of heat conducting material the outer edge of which is serrated or notched so as to improve the contacting between upward rising vapors and down flowing films of liquid. Figure 9 is an end view of the embodiment of exchanger tube of Figure 8.

One purpose of my invention is to provide a heat exchange apparatus designed for the partial vaporization of a liquid stream or for the partial condensation of a vapor stream, either of which contains two or more components, such that the vapor and liquid portions of the fluid stream which is partially vaporized or partially condensed, will be fractionated to the extent that the vapor portion will be substantially free of the heaviest component or components in the entering stream and the liquid portion will be substantially free of the lightest component or components in the entering stream.

When a gas stream, such as a natural gas, is cooled below the temperature at which condensation occurs the condensate which is produced contains a portion of each of the components of the original gas and if perfect mixing of the vapor and liquid portions is obtained (as it practically would be when the condensation occurs in a conventional heat exchanger) the composition of the vapor and liquid portions will be characteristic of the original gas composition and of the pressure and temperature obtained. Also, when a liquid stream such as a natural gasoline, is progressively heated to a temperature above the temperature of initial vaporization, the vapor and liquid portions produced, again assuming perfect mixing and equilibrium such as is approached in a conventional heat exchanger, will be characteristic of the temperature and pressure obtained and each portion will contain some of each of the components of the original liquid mixture.

In performing a partial vaporization or condensation of a complex mixture, such as a mixture of hydrocarbons, it is frequently desirable to obtain a fractionation effect such that the lightest material of the original mixture will occur only or predominantly in the vapor portion produced and the heaviest component of the original mixture will occur only or predominantly in the liquid mixture produced. Conventionally, this objective will be accomplished by the use of a combination of heat exchange and fractionation or absorption processes. It is another purpose of my invention to achieve the same objective by the use of an especially designed heat exchange apparatus.

I shall first explain the design and operation of the proposed apparatus as applied to the partial condensation and separation of a gas stream. As shown in the attached Figure 3, a refrigerant or coolant is passed through the tubes 49, countercurrent to the gas stream which is to be cooled, of the heat exchanger which will generally be positioned preferably in a vertical manner. The gas stream, which is to be partially condensed and separated, enters the lower part of the exchanger shell through inlet 46 and passes upwardly outside the especially designed tubes where it is cooled and partially condensed. The cooled gas from which part or all of the heaviest component has been removed, leaves the heat exchanger shell at or near its highest point through pipe 47. The liquid which is condensed from the cooled gas flows downwardly over the especially designed tubes and countercurrent to the cooled gas stream and leaves the heat exchanger shell at or near its lowest point through tube 48. The especially designed tubes referred to are to be provided with integral or attached projections such as fins or spines. In general, these projections should be a part of or very intimately attached to the metal of the tube itself, to provide the best heat transfer possible. Also, the projections should generally slope downward toward the gas inlet and liquid exit connections and the tubes should be positioned within the shell such that the liquid as formed by condensation will drain downwardly and countercurrent to the rising gas stream without appreciably wetting the outside of the tubes proper and thereby decreasing heat transfer rate. The liquid as formed, is intended to drain toward the outer ends of the fin or spine projections and then drip or flow toward the liquid exit.

From this description of the apparatus, it should be apparent that with a partial condenser of this type an appreciable fractionating effect may be obtained. For instance, in cooling of a natural gas stream from $+50°$ F. to $-50°$ F. by conventional means, the condensate obtained at $-50°$ F. would contain a considerable amount of methane and ethane which might later have to be removed by fractionation means and the uncondensed vapor might still contain a considerable amount of normally liquid gasoline hydrocarbons.

It will, of course, be recognized that various designs of extended surface tubes may be used in the described exchanger. Figures 4, 6 and 8 illustrate several possible designs including finned tubes having the fins perforated or serrated, or also including the so-called spined tubes. Considerations, such as the amount of vapor-liquid contact desired, the relative amounts of vapor and liquid which are to be handled, and the amount of heat required to be transferred, will all affect the choice of preferred tube design.

Should it be desired, it is also possible to use an extended surface inside the heat exchanger tubes. This means might be used to obtain higher heat transfer rates should the refrigerant be cold gas or cold gas-liquid mixture.

It should also be recognized that heat exchangers of the type described may be used in series operation employing the same or different refrigerants in order to obtain a better control of the temperature at which the heat is transferred and also a better control of the quantity of heat that is transferred at a particular temperature level.

A fractionating heat exchanger of the type described will lend itself to those applications where difficulty is encountered with freeze-ups due to moisture, hydrocarbon hydrates or carbon dioxide. Such freeze-ups would occur usually in a single exchanger over a fairly narrow temperature range. By the injection of a supplemental dried "reflux" to the upper portion of the vertically disposed exchanger or by the addition of suitable liquid drying agents such as methanol to the point where freeze-up occurs, the deposit will be dislodged and washed out with the condensate.

Although the above described use is considered to be the most important one for the fractionating heat exchanger, it will also be possible to use the equipment for the partial vaporization of a multicomponent liquid stream to obtain a degree of separation thereof. One might pass through the tubes a "heating" medium which might be anything from cold gas to high pressure steam. One might then inject and distribute into the upper portion of the exchanger shell a liquid which is to be selectively vaporized. Such liquid trickling down over the extended surfaces would absorb heat from the medium within the tubes and the vapors would rise countercurrently to the descending liquid and leave the exchanger shell near its highest point. As the liquid descends over the extended surface to the lowest point of the exchanger shell, it would become progressively heavier or higher boiling. By the proper choice of heating medium, a considerable fractionating effect will be obtainable on a liquid stream which is partially vaporized. The addition of a stripping gas such as live steam to the exchanger shell near its lowest point can also be incorporated for the adjustment of partial pressure such that the desired vaporization may be obtained at the available heat transfer temperature.

Figure 10:
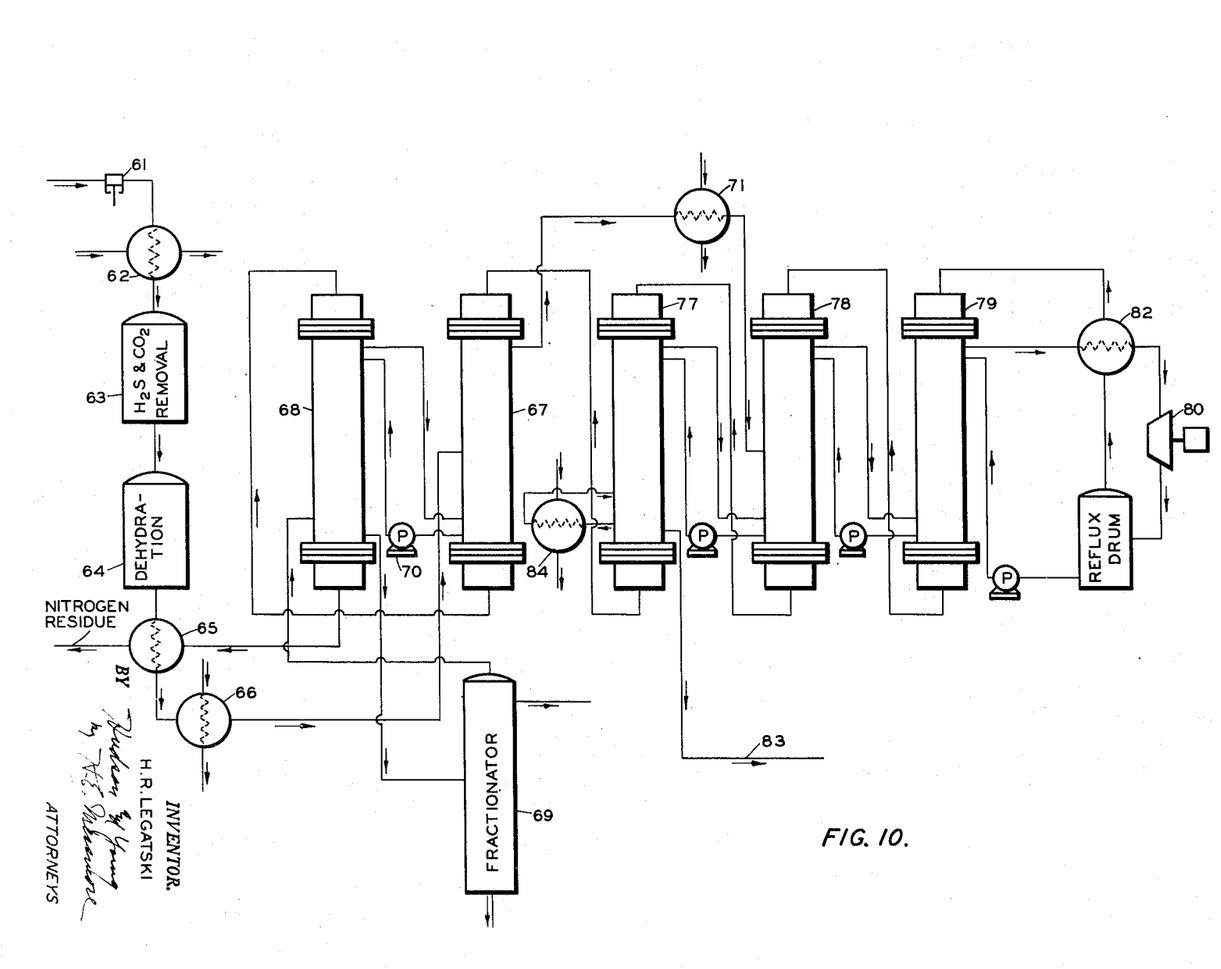
Figure 10 is a flow diagram illustrating one application of my process and apparatus.

The heat exchanger apparatus of Figure 3, when constructed sufficiently large and containing a sufficiently large number of tubes may be used by itself for carrying out a low temperature fractionation or a plant may be used in which a plurality of such heat exchangers may be used. Figure 10 is a flow diagram of a plant in which there are five heat exchangers such as the exchanger of Figure 3.

*Specific example*

The following example illustrates the application of my process to the separation of nitrogen from a natural gas containing 15.46 mol per cent of nitrogen.

low temperature denitrogenation fractionator of my process operates satisfactorily when only 6½ mols of reflux are returned to the top of the column in comparison to 35 mols of reflux returned to the top of a conventional fractionation tower. It should be further noted that in my process using a minimum amount of liquid reflux at the lowest temperature of the process requires only about 21,000 brake horsepower for compression in contrast to about 101,000 brake horsepower for compression in a conventional plant. The 21,000 brake horsepower represents the energy required for separation of the nitrogen from methane plus the slight increment necessary to create the driving force or potential through the walls of the heat exchanger tubes. It should also be understood that this brake horsepower value takes into account the compressor efficiency.

The feed stock to the fractionating exchanger of my invention may be introduced at its dew point temperature or at a temperature below its dew point for a given pressure. When feed to my exchanger contains some liquid, the temperature under such feed conditions is therefore below the dew point temperature under the existing pressure. To introduce feed at a temperature below its dew point, the feed may be admitted at the proper point in the column as determined by the actual composition and physical state or condition of the feed.

For economic reasons, I prefer to introduce a mixed phase feed stream to the column at a temperature below its dew point. Temperatures below the feed point may be maintained above the bubble point temperature of the feed and the temperature above the feed point may be maintained below the dew point temperature of the feed stream.

It is the purpose of the embodiment of Figure 10 to illustrate the application of the fractionating heat exchanger and other related apparatus in a complete plant operating cycle for the separation of a natural gas, having an appreciable nitrogen content, into a natural gasoline condensate stream and a residue hydrocarbon gas stream with simultaneous removal of substantially all of the nitrogen content from the natural gas and with the simultaneous production of concentrates high in ethane, propane and butane. The described process has application in connection with the transportation of natural gas through pipe lines for industrial use in points distant from its point of origin. The valuable natural gasoline hydrocarbons are recovered for use as such in motor fuels or in synthesis operations and the nitrogen content of the natural gas is removed to decrease the load on the pipe line transporta-

| Component, Mol Percent | Feed To Denitro. Col. | Kettle Product | Overhead Product | My Process Reflux Req'd Top of Column | Conventional Fractionation |
|---|---|---|---|---|---|
| Nitrogen | 15.46 | 1.36 | 92.17 | 58.5 | 58.5 |
| Methane | 74.86 | 87.17 | 7.83 | 41.5 | 41.5 |
| Ethane | 6.00 | 7.11 | | | |
| Propane | 3.68 | 4.36 | | | |
| Mol and Lqd | 52.5 | 100 | | 100 | 100 |
| Temp. of | −180° F. | −174° F. | −249° F. | −307° F. | −307° F. |
| Mols | 100 | 84.46 | 15.54 | 6.5 | 35.0 |

The above example illustrates operation of a commercial plant to process about 360 million cubic feet of dry natural gas per day to produce a propane and heavier raw natural gasoline and a nitrogen-free residue gas for delivery to public utility pipe lines. It should be noted that the tion system or permit transmission of more B. t. u. with an existing system. Incidentally, the process permits the extraction of additional quantities of ethane and propane while still producing a residue gas having a B. t. u. value higher than the B. t. u. value of the residue gas now produced by conventional plants wherein the nitrogen is not removed. This permits the sale of a higher B. t. u. value residue gas and at the same time permits the production of a large quantities of ethane, propane, and butane, which are valuable in synthesis operations.

The flow sheet of Figure 10 shows the nitrogen-containing raw natural gas stream as being compressed upon first entering the plant cycle. It is considered that the most favorable operating pressure for the proposed cycle is in the range of 150 to 450 lbs. per sq. in. and compression is only necessary to such favorable operating pressure. Following compression in a compressor 61 the gas should be cooled to 80° to 100° F. in a cooler 62 and then processed for the removal of hydrogen sulfide, carbon dioxide in unit 63 and for removal of water in unit 64. The purification and dehydration processing employed may be of any conventional type as long as substantially complete removal of these impurities is obtained so that little or no fouling of the separation equipment due to deposition of ices or hydrates will be experienced. Following dehydration, the gas should be cooled to its dew point or slightly below and fed to the first of a series of fractionating heat exchangers. This latter cooling may be obtained in various ways but it may be obtained from the waste nitrogen stream in an apparatus 65 and an auxiliary refrigeration system 66. The cold gas and any condensate enters fractionating heat exchanger 67 on which a temperature differential is imposed and in which sufficient reflux is maintained such that a liquid hydrocarbon fraction may be withdrawn from the base of the shell section of the exchanger 67, which fraction will be considerably leaner in methane content than the same volume of condensate produced from the raw natural gas by simple condensation means. The condensate produced in fractionator 68, is shown to be removed to a conventional fractionator system 69 from which an overhead light hydrocarbon fraction containing the methane portion is returned as a vapor and injected into the base of the shell section of exchanger 68. Once operation is established, the vapor so injected, will exert a stripping action on the liquid descending in the shell side of exchanger 67 and it is transferred by a pump 70 to shell 68. The transferred liquid descends in the shell side of exchanger 68, and therein stripping action will direct the methane and other light hydrocarbon content toward and out of the upper shell side of exchanger 68. The function of exchangers 68 and 67 (which of course could be joined end to end as a single unit if so desired) is to separate from the natural gas stream a liquid hydrocarbon fraction containing little or no methane and rich in the heavier natural gasoline hydrocarbons. The total quantity of natural gasoline condensate so produced and the efficiency of methane removal in the fractionating exchangers will obviously be affected by the relative quantities of vapor and liquid in the feed to the units, by the quantity of light hydrocarbon stripping vapor injected and by the quantity of heat transferred through the tubes and the temperature differential imposed between the ends of exchangers. After removal of the natural gasoline condensate fraction in the exchangers 68 and 67, the natural gas stream is further cooled to a temperature below its dew point in a cooler 71 and injected intermediate the ends, on the shell side of the fractionator heat exchange system 77, 78 and 79, operating in series. Once operation is established, the overhead vapor from 79 will be a nitrogen-methane mixture, rich in nitrogen. This vapor stream is cooled and expanded to low pressure isentropically through an expansion engine 80 in which heat may be removed in the form of work. The liquid content of the expansion engine exhaust is pumped by a pump 81 as reflux back to the top of the shell side of the exchanger 79. The cold vapor of the expansion engine exhaust may be first heat exchanged in an exchanger 82 with the gas to the expansion engine and then used as the cooling medium through the tubes of the fractionator heat exchangers 79, 78 and 77 and for other cooling services within the plant. The gaseous expansion engine exhaust comprises most of the nitrogen content of the inlet gas to the plant with some of the methane. After recovery of its cold through heat exchange, it may be either discarded or used for the value of its nitrogen or methane contents. The reflux obtained as the liquid content of the expansion engine exhaust and as obtained through heat exchange in the fractionator heat exchangers 77, 78 and 79, serves to absorb the methane from the overhead vapor to the expansion engine. The natural gas fed to exchanger 77, 78 and 79, after removal of most of its nitrogen content is produced as a gas stream and may be removed from the base of exchanger 77 through pipe 83 for such disposal as desired. For satisfactory operation sufficient excess refrigeration must be available to the exchanger system 77, 78 and 79, including the feed stream, to produce an excess of liquid at the bottom of exchanger 77. This liquid is shown as being removed, vaporized in exchanger 84 and reinjected to serve as a stripping vapor on the shell side of exchanger 77.

By isentropic (reversible adiabatic) expansion applicant means expansion of a vapor or vapor containing some liquid from a given pressure at or close to the corresponding saturation temperature to a lower pressure and lower temperature with the formation of condensate and the production of work.

The expansion engine, as mentioned hereinbelow may be of the centrifugal type or it may be a reciprocating expander. The expander must be of the type capable of handling fluids containing an appreciable liquid content. Suitable forms of the Kapitza (centrifugal) turbines are disclosed in U. S. Patent No. 2,280,585, granted April 21, 1942.

The vaporous feed to the expansion engine 80 is in its vapor form at a given pressure and at or close to its corresponding saturation temperature. To insure the presence of a substantial amount of condensate in the exhaust from the engine 80, the expander must perform work. Thus, a compressor or other apparatus requiring driving power may be supplied to furnish work for the expansion engine to perform. Those skilled in the art will understand that this type of operation is in accordance with the second law of thermodynamics. By this method of operating considerably more heat energy is available because of the release of latent heat resulting from the relatively large percentage of condensate formed by what may be termed isentropic expansion.

The gas cooler 62 may use water as a coolant, if desired, and the gas cooler 66 may use a refrigerant such as propane, ammonia, or Freon, if desired. Cool gas and liquid product streams from the plant may be used to accomplish the other cooling and condensation duties. Heat exchanger 84 vaporizing the excess liquid in the base of fractionator exchanger 77 may use any convenient hydrocarbon stream having a sufficient heat content above the necessary temperature level.

Heat exchanger 82 cooling the gas to the expansion engine may cause partial condensation of this gas and phase separation may be advisable before the gas is passed into the expansion engine. Such a separator may be installed if desired.

It is preferred that the expansion engine for the proposed process be a turbine of the Kapitza type, which can be conveniently loaded by means of a centrifugal gas compressor supplying compressed refrigeration or process gas to the plant. The Kapitza turbine may satisfactorily handle the saturated or wet power gas without encountering erosion trouble. This operation is desirable in order to obtain lower exhaust temperatures and a lower top temperature on fractionator-exchanger 79.

Although the fractionator exchangers are shown as multiple units operating in series with provision for final and intermediate reflux pumping, it is, of course, possible to combine the exchangers into two or even into a single fractionating series such that most of the cold liquid pumping will be eliminated. The use of multiple units may be advisable to eliminate structural difficulties caused by extreme temperature differences between tube and shell during startup and shutdown operation. In most operating instances, pumping between sections of a fractionator exchanger can be eliminated by installing the units in a vertical position, one above the other such that reflux liquid can freely flow as in a conventional fractionator. The individual units should of course be in a staggered position with respect to each other in their horizontal projection in order that tube servicing and maintenance be not hindered.

Materials of construction may in general be selected from among those commercially available, taking into account corrosive nature of materials to be processed. Apparatus parts should be constructed in a manner to withstand pressures and temperatures encountered in such processes.

Such minor yet necessary apparatus parts as valves, temperature and pressure indicating or recording devices, etc. are not shown in the drawing nor described in the specification for purposes of simplicity. The installation and use of such auxiliary equipment is well understood by those skilled in the art.

It will be obvious to those skilled in the art that many variations and alterations may be made in the details of the process herein described and yet remain within the intended spirit and scope of my invention.

Having disclosed my invention, I claim:

1. A method for separating nitrogen from admixture with methane comprising introducing a fluid stream of said admixture at its dew point temperature into an elongated vertically disposed separation zone at a point intermediate the ends thereof, maintaining downward flowing thin films of liquid reflux throughout the length of said zone, maintaining an uninterrupted upward flowing current of vapor continuously in contact with said downward flowing thin films of liquid reflux, maintaining that portion of said separation zone above the feed inlet point at temperatures below said dew point, maintaining that portion of said separation zone below the feed inlet point at temperatures above the bubble point of said feed mixture, withdrawing an overhead product comprising nitrogen in the vapor form and withdrawing a bottoms product comprising methane in the liquid form.

2. The method of claim 1 wherein liquid nitrogen is introduced into the top of said zone as reflux.

3. The method of claim 2 wherein said withdrawn overhead product is partially condensed to liquid and this condensate is returned to said zone as said liquid nitrogen.

4. The method of claim 3 wherein the volume of liquid reflux flowing downward in said zone is progressively increased from the top to the feed point of said zone.

5. The method of claim 4 wherein said volume of liquid reflux flowing downward in said zone is progressively increased by indirect heat exchange.

6. A method for separating nitrogen from admixture with natural gas comprising introducing a fluid stream of said admixture at its dew point into an elongated vertically disposed separation zone at a point intermediate the ends thereof, maintaining downward flowing thin films of liquid reflux throughout the length of said zone, maintaining an uninterrupted upward flowing current of vapor in contact with said downward flowing thin films of liquid reflux, maintaining that portion of said separation zone above the feed inlet point at temperatures below said dew point, maintaining that portion of said separation zone below the feed inlet point at temperatures above the bubble point of said admixture, withdrawing an overhead product comprising nitrogen in the vapor form and withdrawing a bottoms product comprising natural gas in the liquid form.

7. A method for separating a mixture of normally gaseous constituents comprising introducing a feed stream of said mixture into a vertically elongated separation zone at a point intermediate the ends thereof, maintaining a downwardly flowing liquid reflux as a plurality of thin films of liquid, maintaining an upwardly flowing current of vapor throughout the length of said zone, maintaining substantially continuous contact between said liquid reflux and said current of vapor throughout said separation zone, maintaining said vapor-liquid contact under the continuous influence of a plurality of separate and distinct heat exchange surfaces distributed throughout said separation zone, continuously supplying the energy of separation by circulating heat exchange fluids in indirect heat exchange with the vapor-liquid mixture within said separation zone thereby continuously enriching said upwardly flowing vapor with the lower boiling components in said feed stream and continuously enriching said downwardly flowing liquid with the higher boiling components, withdrawing a vapor stream containing the lower boiling components from the top of said separation zone and withdrawing a liquid stream containing the higher boiling components from the bottom of said separation zone.

8. The method of claim 7 wherein said withdrawn vapor stream is partially condensed to liquid and this condensate is returned to said zone as reflux.

9. The method of claim 7 wherein the volume of liquid reflux flowing downward in said zone is progressively increased from the top to the feed point of said zone.

10. A distillation apparatus comprising a vertically disposed, elongated and closed vessel having a pipe connection at either end, means for adding charge stock at a point intermediate the ends, means for adding reflux liquid to the top of said vessel, a plurality of indirect heat exchange means disposed across said vessel, through the wall and terminating on opposite exterior sides thereof at different levels and extended surface heat exchange fins disposed in heat exchange relation with said plurality of heat exchange means, said extended surface heat exchange fins disposed so as to provide generally vertically disposed heat exchange surfaces.

11. A distillation apparatus comprising a vertically disposed elongated and closed vessel having a pipe connection at either end, means for introducing charge stock into said vessel at a point intermediate the ends, a tube for adding reflux liquid at the top of said vessel, a plurality of heat exchange means disposed across horizontal sections of said vessel at different levels, each heat exchange means comprising a plurality of tubes extending from one side of said vessel, through the vessel and terminating on the opposite side of the vessel, the tube ends of each heat exchange means on said one side of said vessel terminating in an inlet header, said tube ends of each heat exchange means on said opposite side of said vessel terminating in an outlet header, means for introducing heat exchange fluid into each of the inlet headers and means for removing heat exchange fluid from each of the outlet headers and extended surface heat exchange fins disposed in heat exchange contact with said plurality of tubes at each level so as to provide a plurality of generally vertically disposed heat exchange surfaces extending throughout the length of said vessel.

12. A distillation apparatus comprising a vertically disposed elongated and closed vessel having a pipe connection at either end, means for introducing charge stock into said vessel at a point intermediate the ends, a plurality of heat exchange means disposed across generally horizontal sections of said vessel at different levels, each heat exchange means comprising a plurality of tubes extending from one side of said vessel, through the vessel and terminating on the opposite side of the vessel, the tube ends of each heat exchange means on said one side of said vessel terminating in an inlet header, said tube ends of each heat exchange means on said opposite side of said vessel terminating in an outlet header, means for introducing heat exchange fluid into each of the inlet headers and means for removing heat exchange fluid from each of the outlet headers and extended surface heat exchange fins disposed in heat exchange contact with said plurality of tubes at each level so as to provide a plurality of generally vertically disposed heat exchange surfaces extending throughout the length of said vessel.

13. In the distillation apparatus of claim 12 wherein each of said plurality of heat exchange means comprises a tube extending from one side of said vessel to the other side.

14. A distillation apparatus comprising a vertically disposed elongated, closed vessel having a pipe connection at either end, means for introducing charge stock at a point intermediate the ends, means attached at the top of the vessel for adding reflux liquid, a plurality of heat exchange means disposed across horizontal sections of said vessel at different levels, each heat exchange means comprising a tube extending from one side of the vessel, through the vessel and terminating at the opposite side, means for introducing heat exchange medium to one end of each heat exchange tube and means for removing heat exchange medium from the other end of each heat exchange tube, a set of extended surface heat exchange fins disposed generally vertical and in heat exchange contact with each heat exchange tube, the top ends of the first set of fins in heat exchange contact with one heat exchange tube being beveled at an angle less than a right angle from the vertical and beveled in the same direction from the vertical as the bottom end of the second set of fins in contact with the next higher heat exchange tube, the bottom ends of said first fins being beveled at an angle less than a right angle from the vertical and in the direction opposite from their top ends, the top ends of the third set of fins in heat exchange contact with the next lower heat exchange tube being beveled at an angle less than a right angle from the vertical and beveled in the same direction from the vertical as the bottom edge of the fins next higher in the vessel, the bottom ends of said third set of fins being beveled at an angle less than a right angle from the vertical and in the direction opposite from their top ends, said fins being so disposed that liquid reflux from the bottom edge of one fin drops onto the top beveled end of the next lower fin.

15. In the apparatus of claim 14 said means for adding reflux comprises a perforate distributor pipe in the top of the vessel for distributing reflux to the top level ends of the top extended surface heat exchange fins.

16. In the apparatus of claim 14 said means for introducing charge stock to the vessel comprises a perforate distributor tube disposed across said vessel for distributing charge stock across the cross section of the vessel.

References Cited in the file of this patent

UNITED STATES PATENTS

| Number | Name | Date |
|---|---|---|
| 320,310 | Suckert | June 16, 1885 |
| 385,504 | Colwell | July 3, 1888 |
| 1,119,312 | Pictet | Dec. 1, 1914 |
| 1,163,423 | Lilienfeld | Dec. 7, 1915 |
| 1,204,521 | Van Fleet | Nov. 14, 1916 |
| 1,212,455 | Claude | Jan. 16, 1917 |
| 1,327,599 | Hunt et al. | Jan. 6, 1920 |
| 1,497,546 | Claude et al. | June 10, 1924 |
| 1,939,104 | Christensen | Dec. 12, 1933 |
| 2,292,350 | Brandt | Aug. 11, 1942 |
| 2,356,530 | Pflock | Aug. 22, 1944 |
| 2,475,957 | Gilmore | July 12, 1949 |
| 2,500,118 | Cooper | Mar. 7, 1950 |
| 2,591,658 | Haringhuizen | Apr. 1, 1952 |